Dec. 23, 1947.  R. S. KERSEY  2,433,126
LAWN MOWER FRAME BRACE
Filed July 7, 1945
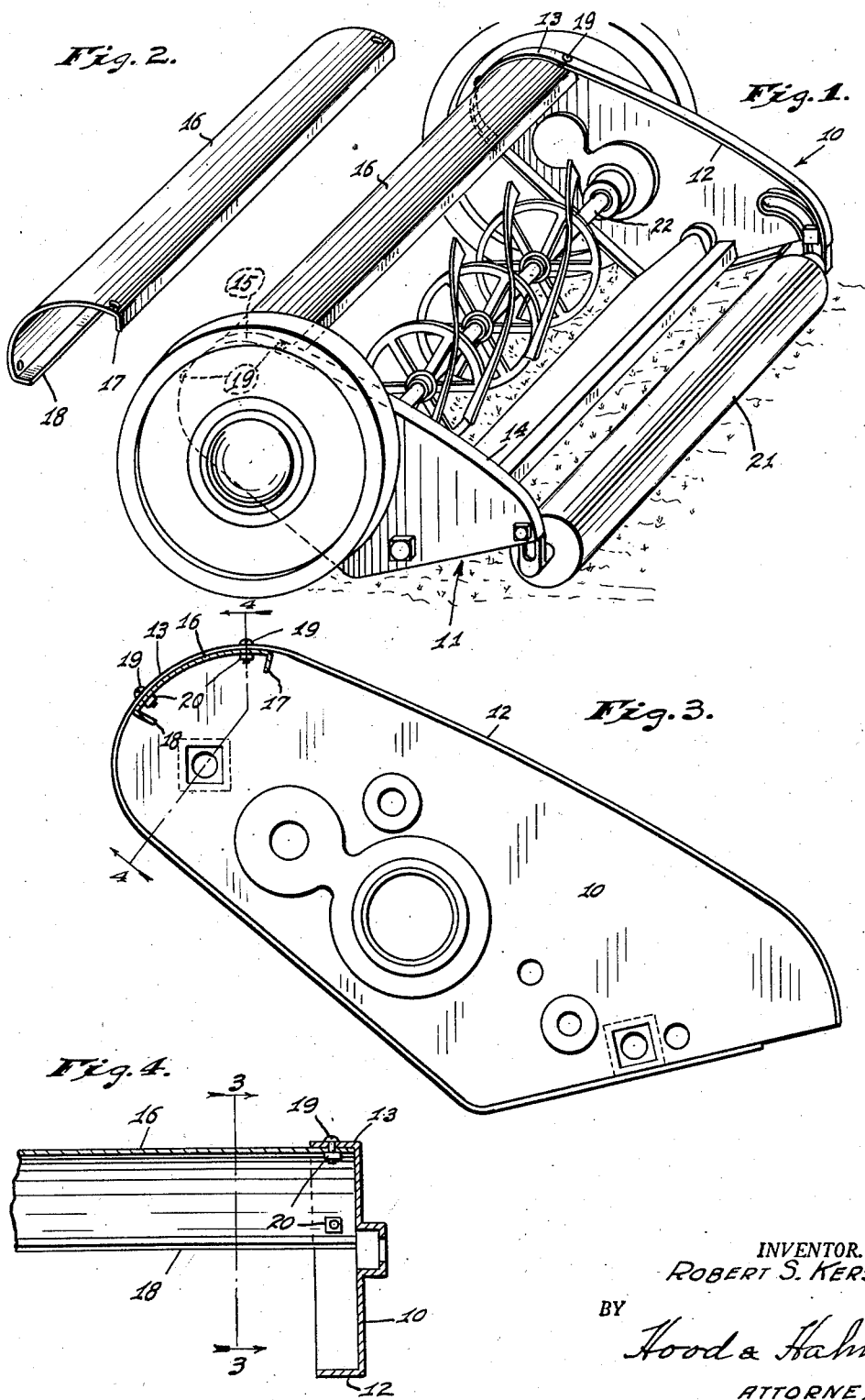
INVENTOR.
ROBERT S. KERSEY,
BY
Hood & Hahn
ATTORNEYS.

Patented Dec. 23, 1947

2,433,126

UNITED STATES PATENT OFFICE 2,433,126

LAWN MOWER FRAME BRACE

Robert S. Kersey, Muncie, Ind., assignor to Great States Corporation, Shelbyville, Ind., a corporation of Indiana Application July 7, 1945, Serial No. 603,631

3 Claims. (Cl. 56—249)

The present invention relates to lawn mowers, both power and hand driven, and more specifically to frame structures therefor. The primary object of the invention is to simplify the construction and the assembly of lawn mower frames, while maintaining a degree of rigidity at least as complete as has been provided by previously known more complicated structures. The invention resides largely in the provision of a particular form of brace, when associated with a particular form of end frame element.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is an isometric view of a lawn mower constructed in accordance with the present invention;

Fig. 2 is a similar view of my novel brace;

Fig. 3 is a side elevation of one end frame element; my brace being shown in section assembled therewith, the view being taken upon a plane indicated by the line 3—3 of Fig. 4; and Fig. 4 is a transverse section taken substantially in the planes indicated by the line 4—4 of Fig. 3.

Referring more particularly to the drawing, it will be seen that I have illustrated a pair of frame members 10 and 11 which are substantially allochiral with respect to each other. The frame member 10 is formed with a perimetral flange 12, and the member 11 is formed with a similar flange 14, the flanges 12 and 14 projecting toward each other. The upper forward portion of the flange 12 is curved, as at 13, about an axis perpendicular to the general plane of the member 10; and similarly the upper forward portion of the flange 14 is curved at 15 about the same axis. A brace member 16, which may be formed of sheet metal, is curved about a longitudinal axis to conform to the portions 13 and 15 of the flanges 12 and 14. The longitudinally extending ends of the sheet 16 are inturned, as at 17 and 18, to lie in planes respectively substantially perpendicular to the immediately adjacent portions of the sheet 16. Great rigidity is lent to the element 16 by this particular cross sectional contour.

In assembling the frame structure, the opposite end portions of the brace 16 are entered beneath, or within, the correspondingly curved portions 13 and 15 of the flange 12 and 14 of the end frame members 10 and 11. Said portions of the flanges are perforated, and the ends of the brace 16 are correspondingly perforated to register with the perforations in the said flanges. Bolts 19 are projected through the registering perforations in the flanges and the respective ends of the brace 16; and securing nuts 20 are turned up upon said bolts, whereby the brace 16 is securely, but removably, attached to the said flanges 12 and 14.

Preferably, the perforations in the brace 16 will be so positioned, with respect to the ends of said brace, that said brace ends will respectively lie in flush engagement with the plane surfaces of the elements 10 and 11 at the bases of their flanges 12 and 14. Thereby, the brace 16 very materially lends strength and rigidity to the whole assembly, tending to resist any relative movement between the elements 10 and 11. Of course, the usual roller 21 is secured between the opposite ends of the frame members 10 and 11, and the usual reel spindle 22 is mounted between said frame end elements, and said spindle and the usual bed knife will cooperate with the brace 16 to hold the elements 10 and 11 with substantially absolute rigidity with respect to each other.

I claim as my invention:

1. In a lawn mower, a pair of allochiral frame members, each formed with a perimetral flange projecting toward the other of said members, each of said flanges having a portion curved about an axis perpendicular to the general plane of its frame member, and a brace constituting the sole connection between the regions of said frame members bounded by said curved flange portions and comprising a strip of sheet metal curved about a longitudinally-extending axis to conform to said curved portions of said flanges and having its longitudinally-extending edges turned inwardly, said brace having its opposite ends engaged beneath, and secured to, said curved portions of said flanges, respectively.

2. In a lawn mower, a pair of allochiral frame members, each formed with a perimetral flange projecting toward the other of said members, each of said flanges having its forward upper portion curved about an axis perpendicular to the general plane of its frame member, and a brace comprising a strip of sheet metal curved about a longitudinally-extending axis to conform to said curved portions of said flanges, and having its longitudinally-extending edges turned inwardly, said brace having its opposite ends engaged beneath, and secured to, said curved portions of said flanges, respectively.

3. In a lawn mower, a pair of allochiral frame members, each formed with a perimetral flange projecting toward the other of said members, each of said flanges having a portion curved about an axis perpendicular to the general plane of its frame member, a brace comprising a strip of sheet metal curved about a longitudinally-extending axis to conform to said curved portions of said flanges, and having its longitudinally-extending edges turned inwardly substantially at right angles to the adjacent portions of such strip, said brace having its opposite ends engaged beneath said curved portions of said flanges, respectively, and bolts passing through each of said flange portions and its respective end of said brace and secured in place by removable nuts.

ROBERT S. KERSEY.

REFERENCES CITED

The following references are of record in the file of this patent:

UNITED STATES PATENTS

| Number | Name | Date |
|---|---|---|
| 2,053,535 | Schielein | Sept. 8, 1936 |
| 2,097,761 | Gallinant | Nov. 2, 1937 |
| 2,299,859 | Speiser | Oct. 27, 1942 |
| 2,378,488 | Loewe et al. | June 19, 1945 |
| 2,238,707 | Ronning | Apr. 15, 1941 |